C. Otis,
8893½X
Washing Machine.
Patented June 15, 1835.
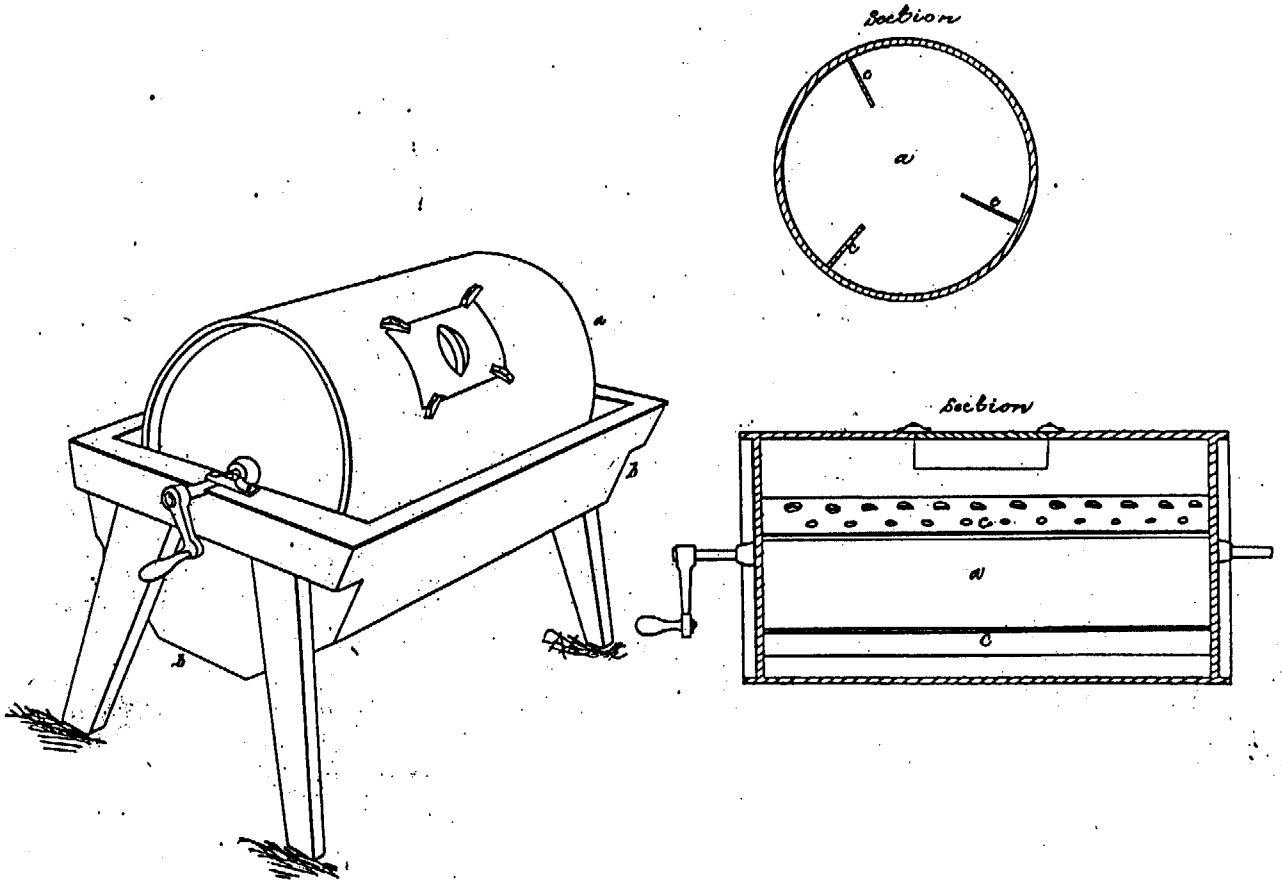
H. PETERS, PHOTO-LITHOGRAPHER, WASHINGTON, D. C.

383 June 15, 1825 109.
88932X

Charles Otis
Letters Patent.

The Schedule referred to in these Letters Patent, and making part of the same, containing a description in the words of the said Charles Otis himself of his improvement in a machine for the purpose of washing clothes or of churning.

To all whom it may concern: Be it known that I Charles Otis of Finksburg in the County of Baltimore and State of Maryland, have invented an improve a machine for the purpose of washing clothes or of churning, and I do hereby declare that the following is a full and exact description thereof.

I make a revolving cylinder or barrel which is to turn upon gudgeons in the usual way, and having an opening through which the articles to be acted upon may be introduced and secured by a close fitting door or shutter. I cause this cylinder or barrel to revolve in a trough, which serves to catch any suds that may be allowed to escape, and which in the churning of butter, may be filled with water either warm or cold, according to the season of the year, and thus facilitate the operation. The parts thus far described I do not claim as constituting any part of my invention, the same having been repeatedly constructed by others; but what I do claim is the following appendage within the revolving cylinder. I place flat wings or buckets on the inside of the periphery of the cylinder, extending along from end to end; of these there may be two, three, or more, made of flat boards, the planes of which stand in the direction of radii to the cylinder. These boards may vary in width from two to six inches, more or less according to the size of the machine, and I sometimes perforate them with holes to increase the agitation of the fluid – They also serve to lift the clothes and suds in washing, or the cream churning, more effectually than the pins which have sometimes been employed for that purpose. I confine my claim exclusively to the employment of the wings or buckets herein described.

Witnesses
John Malchorn
Jacob C. Zingling

Charles Otis

Ent.
W.P.C.

(370 words)

Patented June 15. 1835

Drawing Made